Jan. 19, 1954 M. V. KALFAIAN 2,666,806
COLOR TELEVISION
Filed Dec. 8, 1951 8 Sheets-Sheet 1

INVENTOR.

Jan. 19, 1954 M. V. KALFAIAN 2,666,806

COLOR TELEVISION

Filed Dec. 8, 1951 8 Sheets-Sheet 2

INVENTOR.

Mezur V. Kalfaian

INVENTOR.
Mgrun V. Kalfaian

VIDEO-TRANSMITTER Fig. 4

INVENTOR.
Myron V. Kalfaian

Jan. 19, 1954 M. V. KALFAIAN 2,666,806

COLOR TELEVISION

Filed Dec. 8, 1951 8 Sheets-Sheet 6

INVENTOR.

Migran V. Kalfaian

INVENTOR.
Mayer V. Kalfaian

INVENTOR.

Megur V. Kalfaian

Patented Jan. 19, 1954 2,666,806

UNITED STATES PATENT OFFICE 2,666,806

COLOR TELEVISION

Meguer V. Kalfaian, Los Angeles, Calif.

Application December 8, 1951, Serial No. 260,682

12 Claims. (Cl. 178—5.2)

This invention relates to color television, and more particularly to provide improved methods and means for the transmission and reception of color television signals. One object of the invention is to transmit video signals representing three primary colors over simultaneous amplitude and phase modulation of the carrier wave, whereby first, to provide accurate color selection at the receiving end without the necessity of color-synchronizing waves, and second, to provide high fidelity conveyance of the video signals by utilizing double-sideband transmission of the carrier wave. Another object of the invention is to provide methods and means of scanning color-pictures, which according to the physiological behavior of the human eye in which it is capable of interpreting repetitious production of colored pictures, provides effectively the same amount of chromatic information on the viewing screen as it would ordinarily for monochrome pictures by the same amount of video components that are available in a given channel band. Still another object of the invention is to provide methods and means for conveying picture-synchronizing signals over phase modulation of the carrier wave, whereby to provide greater accuracy in picture synchronization than is possible by the conventional serrated waveform. A further object of the invention is to transmit the sound wave over an amplitude modulated carrier wave having the same fundamental frequency as of the video-carrying wave; without encountering cross-interference. A still further object of the invention is to provide methods and means adapted to receive the particular type of transmission, whereby to provide a complete system of color television. Although the present invention is novel in its form, various distinct inventions are disclosed herein in order to render complete color television system, the various features of which may be referred to by my related U. S. Patent No. 2,558,489 granted June 26, 1951, and copending applications, the serial numbers of which are: 752,601, June 5, 1947, now Patent No. 2,611,826, September 23, 1952; 793,145, December 22, 1947, now Patent No. 2,587,734, March 4, 1952; 3,318, January 20, 1948, now Patent No. 2,615,986, October 28, 1952; and 236,262, July 11, 1951, the disclosures of which are hereby made part of the present application as if fully included herein.

In the U. S. standard of 6 megacycle television band, utilizing vestigial-sideband transmission, the maximum number of image elements that may be transmitted is 8 million per second. With the standard frequency rate of 30 frames per second, this amount of image elements will produce visually acceptable monochrome pictures. But in color television, each image element must be reproduced in three primary-color components, which reduces the total number of image elements to about 2.7 million per second. While this reduction of image elements will apparently impair the image-resolution of monochrome pictures, it is assumed (according to actual tests) that the presence of colors will somewhat compensate for the loss of image detail. Physiological aspects of the human eye have been considered, and accordingly various methods of constructing color pictures on the viewing screen have been proposed, in order to effect maximum pictorial detail utilizing whatever amount of image or color is available in the standard 6 megacycle channel band; of these methods, the presently standardized field-sequential system and the generally known dot-sequential "mixed-highs" system are of current issues. Each of these systems has a different advantage over the other. For example, the former is theoretically capable of producing true-color pictures with reduced image detail, while the latter is capable of rendering fine image detail but with reduced color detail. The latter system is based upon the assumption that the eye cannot distinguish between monochrome and chromatic images in the fine detail, under usual viewing conditions. Such an assumption however may apply only to moving objects, as the eye is definitely capable of seeing fine color-detail in stationary objects; and under usual conditions most of the viewing screen comprises stationary objects.

To briefly differentiate various conditions in which the eye is capable of seeing colored pictures, assume that a moving colored-object is produced on the viewing screen in its first primary-color at the first moving-position; in its second primary-color at the second moving-position; and in its third primary-color at the third moving-position. In the case that the object covers a large viewing-area with few high-lights, the eye can easily distinguish the object in all three positions in three separate colors; with some rendition of the three-color hue. This may be proven by the fact that, in the field-sequential system the eye will see a solid color (red being most prominent) for a brief period of time, whenever a diversion to and from the picture-screen is made; even though the colors change at the extreme rapid rate of 144 fields per second. However, when the object has intricate color detail, the eye cannot interpret the differences of color in elementally adjacent areas, and will average out into a new color. On the other hand, if the object has no movement of its own and moves steadily against a stationary background scene, the eye can follow its movement very easily, and therefore, the eye can see all the color-detail as if it were stationary on the screen. For example, the pictorial details of the body of a running horse can be easily seen, but the legs will appear as a blurr. It follows therefore, that the eye can definitely see fine-detail in stationary objects, whether it be in color or black and white; and can definitely see separate primary-colors of massive objects in moving positions; but cannot detect fine-detail in moving objects. Under these viewing conditions, it is obvious therefore that, in field-sequential system the color-sequence cannot possibly be reduced below the presently practiced frequency rate of 144 fields per second. Similar inefficiency will be had if all the image elements were scanned and conveyed in simultaneous primary-colors, or in a sequence of three primary-colors, the system of the latter of which may be termed as, "dot-sequential-color" system. The reason for this inefficiency is that, constructing each image element in three primary-colors in such short elemental time is a waste, because the eye cannot respond to elemental changes in color or image, at a slow frequency rate of about 10 per second; in contrast to the 144 massive color-fields per second. Thus by taking advantage of such behavior of the human eye, we may reverse the "dot-sequential-color" system into "dot-sequential-image" system, to retain all the available image-detail, and still produce all the image elements in full three primary colors; in contrast to the very little color that is available in the "mixed-highs" system.

Various methods of scanning may be employed for the presently proposed dot-sequential-image system. In one mode, all the image elements in a picture-frame are scanned in one of their primary colors, but so arranged that, the adjacent image elements will have different primary colors, so as to render mutual aid in visually effecting three-color hues. Then on the succeeding second and third frame periods each image element is further resolved into the final three-color hue. Adhering to the standard 30 frames per second, each image element is constructed in its final color in one tenth of a second. But this rate is not visually slow, because the whole picture is still constructed in $\frac{1}{30}$ second, and each picture-frame will in most part appear in full-color by way of the elementally-different adjacent colors, since as stated above, the eye resolves elemental colors into massive colors while the object is in motion; even in the slow frequency rate of $\frac{1}{10}$ second, without flicker or twinkle of image or color. Accordingly, the object of the present invention is to provide methods and means of scanning color pictures, in which successive image elements are scanned in one of their primary color components, in a mode, as adjacent image elements to consist substantially of different primary color components, so as to visually effect three color hues in each picture-frame; and change the sequence of elemental color components of adjacent image elements during successive frame periods, whereby to further resolve said elemental images individually into their three color hues, and thus utilize effectively all the image elements in a monochrome system in constructing the picture, plus visually effecting three-color hues without sacrifice in color detail.

Various difficulties had previously been experienced in color television, in which accurate color-synchronization and high fidelity signal transmission had been shown to be of primary importance for the successful operation of the color-system. With regard to previous proposals, precise color-synchronizing method or system appears to be non-existent at this time. For example, referring to the newly revised form of "mixed-highs" system (known as NTSC oscillating color system), there is employed a local oscillator at the receiving end, which oscillates at the subcarrier frequency. To ensure synchronization, there is transmitted a burst of sine wave after each sync pulse, whereby this sine wave adjusts the phase angle of the local oscillation. After such phase adjustment, the local oscillator continues oscillating at its natural frequency, for color distribution, up to the end of the line. But if at the end of the line this oscillation had shifted $\frac{1}{3}$ of a cycle, there will occur 100% color overlap, with gradual color cross-talk between the two edges of the picture.

With regard to high fidelity signal transmission of video signals, it had been shown by previous tests that, reproduction of pictures in natural color is dependent upon superposition of different primary-colors having definite brightness levels. Such high fidelity reproduction is not possible with the presently standardized vestigial-sideband transmission system. In this type of modulation, the high frequency amplitude variations must first be pre-distorted at the transmitting end in comparison with a standard set, so that the reproduced picture at the receiving end may be intelligible. Even with such monotoring, the ideal amplitude correction cannot be realized; although it may be satisfactory for monochrome television.

Accordingly in the preferred embodiment of this invention, there is provided a novel method of simultaneous amplitude and phase modulation of the carrier wave, whereby first, to provide accurate color selection at the receiving end without the necessity of color-synchronizing waves, and second, to provide high fidelity conveyance of the video signals by utilizing double-sideband transmission of the modulated carrier wave.

In another embodiment of the invention there is provided a color-sequence reversing switch, so that the sequence of phase modulation may be reversed at elemental scansion intervals, in order to convey the signal of whichever primary color (second or third) is present at an elemental time. To describe the purpose of this operation, it may be assumed that in all color television systems each image element will contain a maximum of three primary-color components. If it were the case that every one of the image elements had contained all the primary colors simultaneously, then the time allotted to convey these components in any color-system would be utilized at the maximum efficiency. However, such is not the case in colored-pictures, and in the major part of one picture-frame the majority of elemental images will contain only one or two primary colors simultaneously. Hence, the time allotted for conveying the missing primary colors will be completely wasted, and result in poor image detail. In order to utilize most of the time allotted for conveying the three primary-color components, advantage is taken of the fact that, simultaneous amplitude and phase modulation will provide three-way selectivity of the video signals, for example, by assigning amplitude modulation to convey video components of the GREEN color; assigning phase modulation of the carrier wave in forward direction to convey video components of the BLUE color; and assigning phase modulation of the carrier in backward direction to convey video components of the RED color. Then, by employing a color sequence-reversing switch (instantaneous in action), the sequence of video components of the BLUE and RED colors may be changed at any random elemental scansion period, to transmit the signal of whichever color is present at that time, thereby utilizing greater portion of the time that is available for transmitting video signals in a given channel band. When an image element consists of three primary colors, the third color is produced during the succeeding frame period, by simply reversing the transmission time-sequence of the RED and BLUE primary colors.

Fig. 1 shows how the color-sequence is reversed elementally. As an example, assuming that in the first original-image-element of the first frame the BLUE primary color is normally assigned to be conveyed, the reproduced image will contain GREEN and BLUE primary colors. Then, by reversing the sequence of this assignment in the succeeding frame, the same image element will be reproduced by the GREEN and RED primary colors, in order to visually effect the original three-color hue. Similarly, in the second image element, consisting of only two primary colors, the RED primary color is produced during the first frame period, and the BLUE primary color during the second frame period. The third and fourth image elements are other examples, where the two primary colors are produced simultaneously in each succeeding frame period. It will be noted however that when the RED and BLUE primary colors are present simultaneously in an image element, some saturation control must be included in the system, as the time of phosphor excitation allowed at the receiving end for these colors will be less than the time allowed in other color-combinations. Since the storage characteristics of color phosphors may be fixed by standardization, the magnitude of saturation control may be fixed, depending on whether the RED and BLUE primary colors are present simultaneously or not.

In accordance with the presently proposed dot-sequential-image scansion, Fig. 1*a* shows one exemplary arrangement of elemental color-sequence as produced on the viewing-screen. The first frame shows elemental images reproduced individually in different primary-color components; in the second frame the same image elements are reproduced individually in still different primary colors; and in the third frame elemental images are finally constructed in their three-color hues. It will be noted however that, at the end of the first three frames every second succeeding image element will still contain two primary colors; this sequence being altered during the second three frames, such as shown in the last two rectangles of the drawing. Since according to the color-sequence shown the scansion of GREEN (or other prearranged color) primary color is repeated in every other elemental area, a saturation control is also provided for this color; which can be of a fixed value. With the inclusion of the color-sequence reversing switch, as mentioned above, the color sequence as shown in Fig. 1*a* will vary, since in the absence of one elemental color (second or third) the other color will be scanned instead. It will also be noted from the arrangement of elemental color dots, shown in the drawing, that none of the primary colors draws a line in any direction on the picture frame, for possible line crawl.

The elemental color-sequence shown in Fig. 1*a* is given only as an exemplary arrangement for visually effecting high-definition colored pictures on the viewing screen, when considered in conjunction with the simultaneous operation of the color-sequence-reversing switch. As shown in the drawing, the number of elemental images in either horizontal or vertical direction is adjusted to be $4N+1$. In the event however, when the conventional amplitude modulated transmission is utilized to convey the presently proposed dot-sequential-image signals, then the color-sequence of the elemental images may be distributed in regular sequence (altering in every succeeding frame), so that all the image elements of the picture may be constructed in three primary colors at every third frame period; instead of at every alternate third frame, since the elemental distribution is over only amplitude modulation.

*Time-division and simultaneous AM and PH modulation*

In the general mode of time-division transmission, where the carrier wave is interrupted abruptly at a high frequency rate, the sidebands usually expand beyond undesired frequency regions. However, the output products of the modulated carrier can be restricted to particular frequency regions by controlling the waveshape of the time-divided carrier envelopes. Where these spectral limitations are observed, it is basic that the waveshape of the interruption be that of the curve of the sine squared function, which rises and falls from substantially zero carrier level in not less than a definite time period $t_m$. Such wave-controlled time division of the carrier shown at A in Fig. 2, wherein, the peak amplitude of each envelope represents a first video signal, and the carrier phase in each envelope represents a second video signal. In dealing with pure phase modulation, the carrier phase is usually shifted representative of intelligence, against a reference carrier of constant phase. To re-translate this modulated carrier into the original intelligence, a local reference carrier is produced at the receiver, and the phases of the two carriers are compared for detection. However, local generation of the reference carrier is impractical, in that, it is difficult to retain the frequency and phase of the local oscillation constant. For this reason, it is contemplated herein to provide means to time-divide the carrier wave, and shift the phase angle in each time division representative of intelligence, by a difference-angle measurable from a preceding angle, whereby each preceding step of phase change represents a reference angle to a succeeding step of phase change. Detection of this type of phase modulation is achieved by comparing the phase of the incoming carrier wave obtained (after amplitude-limitation) from two circuits; one having high resolution time constant, and the other having resolution time constant equal to one time-division period of the carrier wave. In order to provide pure phase modulation, and in view of sideband restrictions, the carrier phase angle in each envelope is held synthetically in steady state condition from boundary to boundary, and shifted abruptly, representative of intelligence, at the minimum carrier level so as to avoid transient effects between the succeeding phase shifts. For a thorough understanding of the conditions in which these sideband restrictions are obtained, reference may be made to the sideband theory given in my second and fourth patent issues mentioned in the foregoing.

Referring to the time-divided waveform of the carrier at A in Fig. 2, it is seen that the video signals are carried over the peaks of the envelopes. Whereas in the conventional mode, the video signals are carried over both the rise and fall (positive and negative alternations) of the envelopes. That is, the time of signal resolution allowed in the present type of modulation is twice the time that is normally required in the conventional double-sideband transmission type; with the result that only half of the total number of video components are conveyed over amplitude modulation, and the other half of the video components are conveyed over phase modulation. Thus in accordance with the U. S. standard of 6 megacycle channel band, the total number of video components transmitted is 6 million per second (time division of the carrier being 3 million envelopes per second), in contrast to the 8 million video components that are transmitted over vestigial-sideband transmission. This reduction of video components however, is compensated by the above mentioned color-sequence-reversing switch of the second and third primary-color components. Reference to the type of simultaneous amplitude and phase modulation employed herein may be made to my U. S. Patent No. 2,558,489 issued June 26, 1951.

*Video-audio channel interposition*

To explain the condition in which video and audio channels may be transmitted in the same spectrum bands without causing cross-interference, first assume as an example, that the video and audio carriers are of the same frequency and contain only amplitude modulations; waveform of the video carrier being as at A in Fig. 2. When these two carriers are combined in phase, there will appear side components both around the fundamental and the fixed pair of complementary side-frequency waves of the video carrier; arising from audio modulation. When these two carriers are combined at differing angles, there will appear other side components arising from both AM and PH modulations. To either one of these two combinations, when the original audio-modulated carrier is re-added out-of-phase, then both the audio channel and all secondary side components arising from cross-modulation will dissappear; remaining only the original video-modulated carrier. By this example, it is shown that if the audio carrier can be kept free of video interference, the video carrier may be received by a wide-pass circuit, and the audio carrier filtered out therefrom. Since as explained, the secondary side components are only resultant at the point where the interposed carriers combine, such as at the receiving antenna, these side components will also dissappear by the act of audio-carrier filtering. In actual practice however, the video carrier will contain a wide range of modulation frequencies, which will contribute to the audio carrier, and cannot be eliminated by any filter means. To obviate this condition, video-to-audio interference may be eliminated by way of pre-controlling the video carrier phase at the transmitting end.

Owing to the fact that many video envelopes of various heights are produced (several hundred) during one cycle period of the highest audio modulation frequency, it is possible to measure by an interference meter (at the transmitting end) the amount of video contribution imposed upon the audio carrier, and according to such measurement, reverse the video carrier phase at such random envelope steps, as to balance out the video contribution falling in the range of audio spectrum. In this step, it is assumed that both video and audio carriers arrive in phase at the receiving antenna. Also, interference meter is referred to a simulated audio receiver at the transmitting end, which according to the amount of excitation it receives from the video carrier, operates a carrier-phase reversing device at random short-pulse intervals.

With reference to color television, utilizing simultaneous AM and PH modulations of the type shown at A in Fig. 2, it had been described that the carrier phase in each succeeding envelope shifts forward or backward representative of an elemental image component of the second and third primary color in steady state step by an angle that is measurable from a preceding step of the carrier phase. In other words, the reference carrier phase shifts continually in time-division steps. This type of phase modulation differs from the ordinary type, in that, phase angle of the carrier in the ordinary type remains constant whenever the modulating voltage remains constant. Whereas in the present type, the carrier phase shifts continually in steady state steps; even though the modulating voltage is in a steady state. In other words, as far as the audio-carrier is concerned, the video carrier is looked upon as being frequency modulated. And because these phase shifts occur at a high frequency time-division rate, most of the video contribution imposed upon the interposed audio channels will be cancelled out depending upon whether one or both of the second and third primary colors are present, and the angle at which the carrier phase shifts from envelope to envelope. However, for complete elimination of video-to-audio carrier interference, an interference meter is included at the video transmitting end, to shift the carrier phase randomly in very short-pulse intervals, so that color spots on the viewing screen at the receiving end will be too small and of short duration to be apparent or objectionable to the viewing eye.

A number of interposed audio channels may occupy the video spectrum. But because side-components resulting from cross-modulation of video-audio channels will spread over adjacent video channels, the desired video channel cannot be selected by a circuit having band-pass of only a single video channel-width, as the interfering side components cannot be filtered out without the cancelling-action by the original audio carriers. Another way of looking at it is that, the secondary side components are modulated by video frequencies, and cannot be separated from the selected video frequency modulation. For this reason, the interposed audio-channels in the selected video-channel and those in the immediate adjacent video-channels that cause secondary sidebands spreading over the selected video-channel (arising from phase modulation due to cross-modulation of the audio and video carriers) are first filtered out by a series of narrow-band filters, and secondly, the video channel is selected in the usual manner. When the rate of phase control of the carrier is such that its contribution to the audio carriers is barely audible, then there are used as many narrow-band filters as there are interposed audio-channels in the selected video-channel. However, the frequency rate of video-carrier-phase change may be substantially increased without impairment to the image, and allow the use of wider-band audio-channel filters for reducing their numerical size.

While the description involves a plurality of audio-channel interposition with that of the video-channel, the main purpose here is to transmit the audio-carrier at the video-carrier frequency for spectrum conservation and simplicity of the receiving set. Accordingly, and in view of the foregoing information, the invention in its broad aspects provides the following steps: scanning color-pictures in the usual sense of horizontal and vertical directions in a frame period; including horizontal and vertical retracings, and deriving therefrom simultaneous video signals representing first; second; and third primary-color components of the image elements, time dividing the video signals at a frequency rate equal to the highest number of image elements to be conveyed per second, producing a carrier wave and time dividing it into individual envelopes at a frequency rate equal half that of the time-divided image elements, modulating the carrier amplitude step by step in every succeeding envelope by the first primary-color components of every second of the time-divided image elements, advancing the phase of the carrier wave step by step in every second envelope by the second primary-color components of every fourth of the time-divided image elements; lying in time positions ahead of last said every second image elements, retarding the phase angle of the carrier wave step by step in every other second envelope by the third primary-color components of every fourth of the time-divided image elements; lying in time positions behind of last said every second image elements, whereby first, to simultaneously convey one of the primary-color components of sets of two succeeding image elements in each succeeding carrier envelope, and second, to effect scansion of the elemental images in singular primary-colors substantially elementally-different from adjacent image elements in a picture frame, whereby to effect mutual color-aid in visually forming chromatic-picture in a single scanned-frame by substantially all the image elements that would normally be available for monochrome picture, altering the sequence of primary-color components of said elemental images during relatively slow frequency rate of successive frame periods, whereby constituent primary-color components of individual image elements are scanned substantially coincident during successive frame periods for full three-color scansion, reversing the normal sequence of said phase-modulating second and third primary-color components randomly at elemental carrier-envelope periods depending on which of the two color components is present or predominates the other, whereby greater portion of the total effective time devoted to conveyance of video signals is utilized to further the color and image resolution, controlling the amplitude level of color components, whereby to correct distortion in hue that may occur at various elemental picture areas due to differences in time lengths of scansion between various primary color components, and amplitude waveshaping said modulated carrier envelopes, in a sense that, at the boundaries the carrier level is lowered gradually to negligibly minimum level, thereby to allow wide angle phase shifts of the carrier at said minimum levels without causing appreciable transient effects.

There is also provided the steps of producing a sound-carrier wave having the same frequency as said video-carrying wave; or in the vicinity thereof, modulating the amplitude of aforesaid carrier by sound waves, measuring the amount of video-signal contribution that is imposed upon the sound waves, and according to such measurement, shift the phase angle of the carrier in said envelopes periodically, whereby to cancel out the video-signal contribution periodically during any one of the sound-wave cycles. Further steps are provided to convey picture-synchronizing signals over phase modulation of the carrier, whereby to effect greater accuracy in picture-synchronization than may be achieved by the conventional amplitude modulated serrated form. Still further steps are provided to receive the transmitted signals. These and other features thereof will be better understood from the following detailed specification, with reference to the accompanying drawings in which:

Figs. 1 and 1*a* illustrate scansion sequence of elemental images in different primary colors.

In Fig. 2 at A there is shown the waveform of the modulated carrier in accordance with the invention, and the drawings at B to E illustrate the steps in which the carrier is modulated in its final form.

*Steps in which the carrier envelopes are produced*

Figure 2:
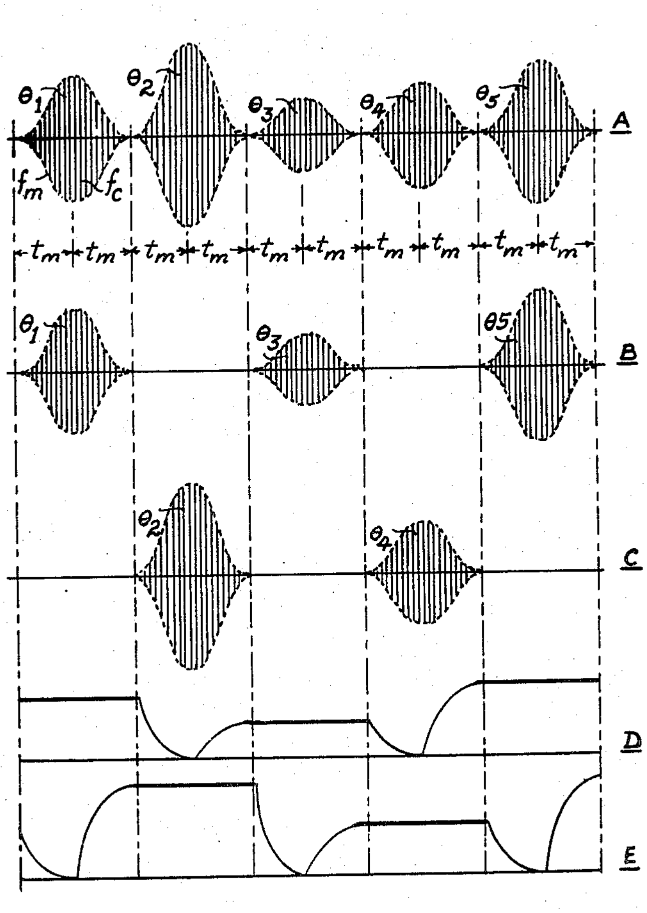

In order to modulate the carrier in the illustrated form of A in Fig. 2, the carrier wave is produced in two separate channels, and the outputs of these two channels are gated in alternate sequence at the time-dividing frequency, whereby during the quiescence of each channel the carrier envelope may be waveshaped and simultaneously amplitude and phase modulated, by sampling method, and finally the periodic outputs of the two channels are combined for final transmission. For example, at the output of the first channel, periodic carrier envelopes at B are produced, and at the output of the second channel, the periodic carrier envelopes at C are produced. Then by combining the periodic carrier envelopes at B and C, the desired waveform as shown at A is obtained. The peak amplitudes of the periodic envelopes of the carrier wave at B are determined by the steady state sampled voltages shown at D, and the peak amplitudes of the periodic envelopes of the carrier wave at C are determined by the steady state sampled voltages shown at E. The manner in which the carrier phase in each envelope is shifted in a steady state step will be described by way of the transmitter shown in block diagram of Fig. 3.

*Phase and amplitude modulated transmitter*

Figure 3:
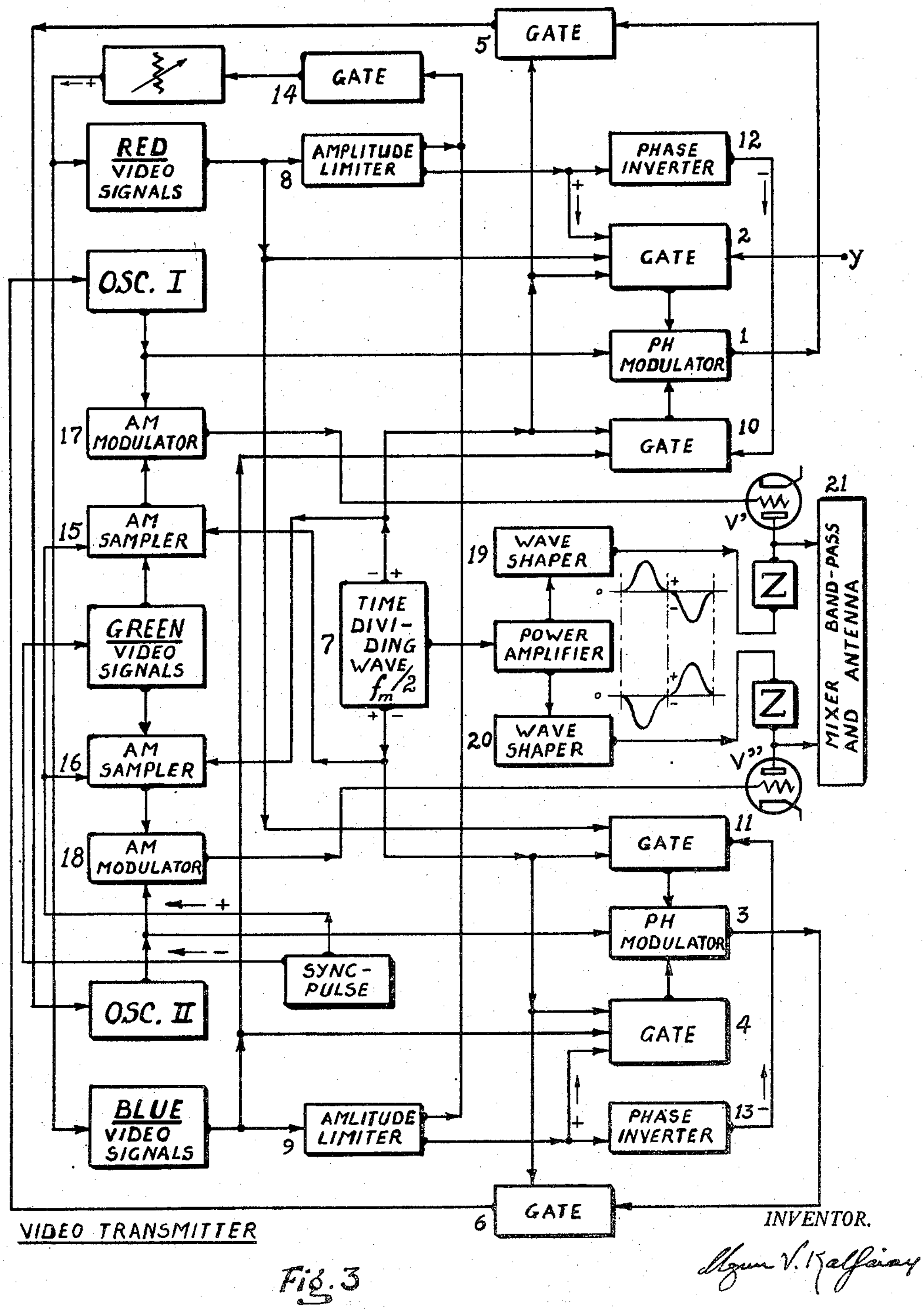
Fig. 3 is a block diagram of the transmitter in accordance with the invention.

In the case where two primary-color components of a single image element are to be conveyed over each time-division of the carrier wave, the transmitter in Fig. 3 is given. In this arrangement, the carrier wave is produced by two independent low Q oscillators I and II, both of which oscillate at the carrier frequency. The phase angle of oscillation I is shifted periodically in phase modulator 1, by signals arriving from the RED video source, through normally idle gate 2, while the phase angle of oscillation II is shifted periodically in alternate sequence with the former, in phase modulator 3, by signals arriving from the BLUE video source, through normally idle gate 4. The phase modulated oscillations I and II are applied upon each other periodically in alternate sequence, to forcefully shift each other's phase angles, by angles representative of RED and BLUE video signals, measurable from phase angles that the oscillations I and II had resolved in immedate preceding intervals. This operation is performed by cross-applying the phase modulated oscillations I and II through normally idle gates 5 and 6, which are operated in periodic sequence by the alternate half-cycle waves of the switching wave at frequency $f_m/2$, generated in block 7. This switching wave also operates the gates 2 and 4 in alternate sequence, so that the RED and BLUE video signals are admitted therethrough and modulate the phase angles of oscillations I and II in phase modulators 1 and 3. Ordinarily the gates 2 and 4 would not be necessary, but they are included for the purpose of reversing the time-sequence of RED and BLUE video-signal modulations when the color-signal assigned to an elemental scansion time is absent, so that the other color-signal can be transmitted instead. This performance is achieved as follows:

The RED and BLUE video signals are passed through amplitude-limiters 8 and 9, the output voltages of which determine whether the input signals are present or not at any given instant. Due to limiting action, the output voltages of limiters 8 and 9 are of constant amplitudes, which are applied additively upon the gates 2 and 4. The input cut-off bias voltages of gates 2 and 4 are so adjusted that, they operate only when positive voltages from limiters 8, 9 and switching wave $f_m/2$ arrive at their inputs simultaneously. Thus, when both RED and BLUE video signals are present simultaneously during an elemental scansion period, the modulation sequence proceeds as normally assigned. Reversal of this sequence is achieved by cross-application of the RED and BLUE video signals upon phase modulators 1 and 3, through gates 10 and 11. These gates are operated by the alternate positive voltages from block 7, but are normally prevented from operation by negative voltages arriving from the outputs of limiters 8 and 9, through phase-inverters 12 and 13. Accordingly, when both RED and BLUE video signals are present simultaneously during an elemental scansion period, the gate 2 or 4 operates to transmit the normally assigned color-signal. But when this assigned color-signal is absent, either gate 10 or 11 is caused to operate, which in turn effects carrier-phase modulation by the other color-signal. Thus, most all of the elemental scansion periods are utilized for transmission, which otherwise would be lost in regular sequential transmission.

For color switching, the signals of video RED color advance the carrier phase, and the signals of video BLUE color retard the carrier phase, whereby color signals may be automatically selected at the receiving end.

As explained previously, when during an elemental scansion period both the RED and BLUE video signals are present simultaneously, a saturation control must be included in the system. Since this control is fixed, and need only be on or off during an elemental scansion time, the output voltages of gates 8 and 9 are passed through gate 14 to control the gain of RED and BLUE video sources; the bias of gate 14 being so adjusted that it operates only when the limiters 8 and 9 are active simultaneously.

For combined phase and amplitude modulation, the periodic steady state phase modulated portions of oscillations I and II are further amplitude modulated in steady state steps by video signals of the GREEN primary color. The original video signals of GREEN primary color are sampled in AM-samplers 15 and 16 periodically (as shown at D and E in Fig. 2) in phase with the steady state phase modulated portions of the oscillations I and II, so that these periodic portions are simultaneously amplitude modulated in the AM-modulators 17 and 18, by the video GREEN signals. Thus, the outputs of modulators 17 and 18 contain simultaneous amplitude and phase modulated carrier, in alternate steady state steps at the time-dividing frequency rate. The outputs of these modulators are independently applied upon the grids of gate-and-amplitude modulator tubes V' and V'', which are normally rendered inoperative. The plate voltages of these tubes are alternately supplied by the wave $f_m/2$, which is amplified and wave-shaped, such as indicated by the waves next to the waveshaper blocks 19 and 20. These alternately variable plate voltages operate the modulator tubes during those periods in which the input carrier oscillations are modulated in steady state steps, and sequential envelopes of the carrier wave appear across the plate tank circuits of these tubes, which are then mixed in block 21, to obtain the carrier wave in the form as shown at A in Fig. 2. For final wave-shaping of the carrier envelopes, reference may be made to my U. S. Patent No. 2,558,489 issued June 26, 1951.

*Modified arrangement of the transmitter*

Figure 4:
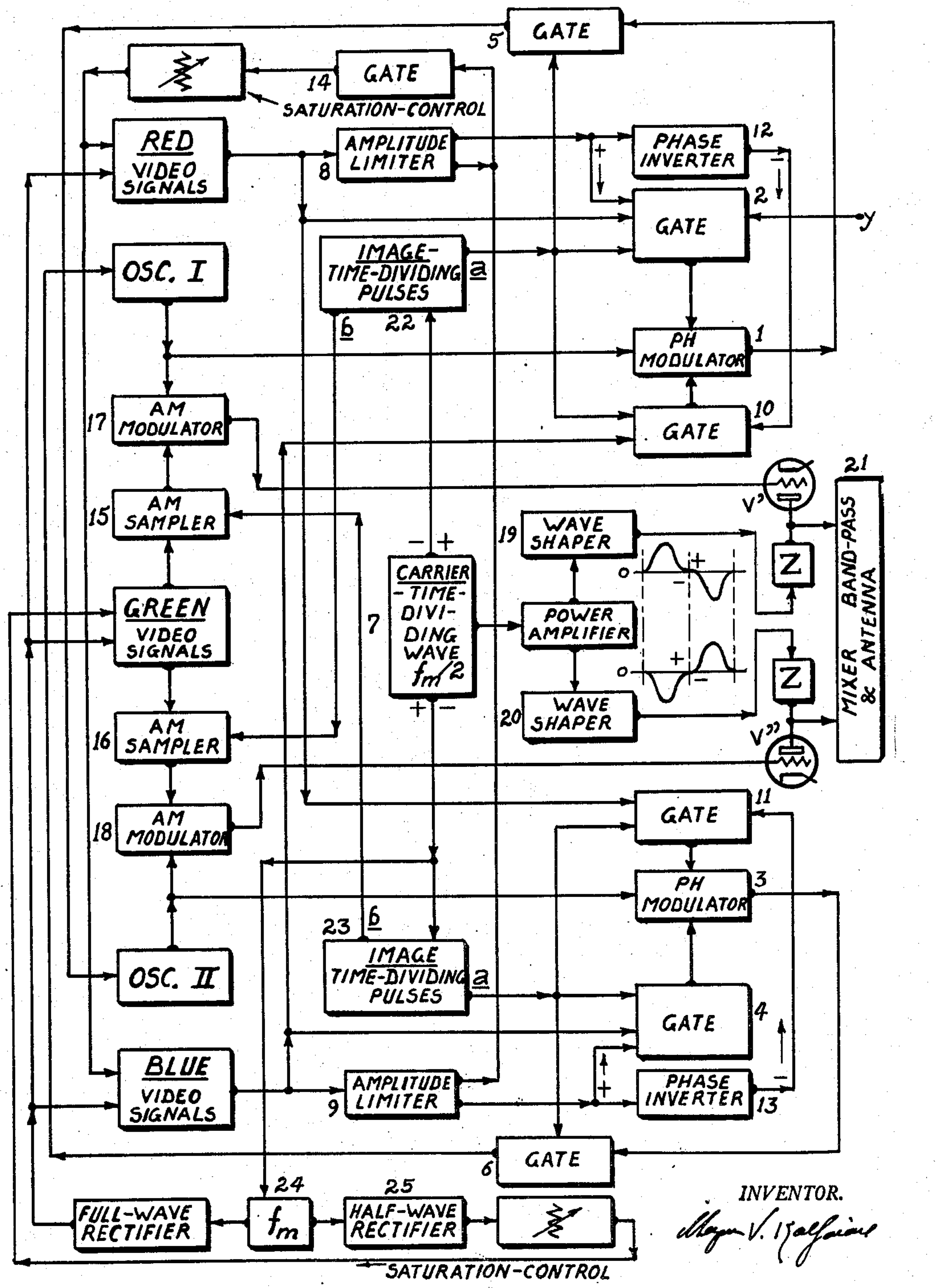
Fig. 4 is a modified arrangement of the transmitter.

It was explained in the foregoing that the block arrangement of Fig. 3 will provide for conveying two color-components of an image element simultaneously during each carrier-envelope period. Instead, as proposed in the invention, when each carrier envelope is to convey color components of two image elements simultaneously, then the modified arrangement of the transmitter in Fig. 4 is employed, the operation of which is described by way of the illustrated graph diagram in Fig. 5. Statistic magnitudes of the camera pick-up color-components of image elements are shown at B, wherein, each odd-section represents either RED or BLUE primary color of the image element, while each even-section represents only GREEN primary color of the image element; this color-sequence being reversed from line to line, as described in the foregoing. Prior to production of the first carrier envelope at A, the color components E1 and E2 at B are sampled and stored, so that both the carrier phase and peak amplitude of the first envelope are modulated by these signals. More specifically, during the time period of E1 at B, the phase of carrier oscillation I at C is shifted by a representative angle $\theta 1$, and continues oscillating at that phase thereafter. During the time period of E2 at B, the sampler at D (such as the sampler 15 in Fig. 3 or 4; various numerals being repeated in Fig. 4, for comparison of like parts with that of Fig. 3) stores a voltage equal to E2. Then, during the first carrier envelope at A, the carrier oscillation I at C, oscillating constantly at angle $\theta 1$, is amplitude modulated by the steady state voltage E2 at D, and finally envelope-shaped, such as shown by way of the arrangement of Fig. 3 or 4, for radiation.

During the time period E3 at B, the phase of carrier oscillation II at E is shifted by a representative angle $\theta 3$, and continues oscillating at that phase thereafter. During the time period E4 at B, the sampler at F (such as the sampler 16 in Fig. 3 or 4) stores a voltage equal to E4. Then, during the second carrier envelope at A, the carrier oscillation II at E, oscillating constantly at $\theta 3$, is amplitude modulated by the steady state voltage E4, and finally envelope-shaped, such as described by way of the transmitter of Fig. 3, for radiation. This operation continues alternately between oscillations I and II, for continuous production of the carrier envelopes, as illustrated.

The pulses for operating various gate circuits to effect oscillatory phase shifts, and the samplers, for discharging and charging storage condensers, are shown in their proper time sequence at G to L in the drawing. For example, the pulses at G operate gate circuits, through which modulating signals are admitted for shifting the phase angle of oscillation I. The pulses at H operate a discharging element for discharging a storage condenser in sampler at D. And the pulses at I operate a charging element to store a proportional signal quantity in a storage condenser, in sampler at D. The pulses at J to L are produced in alternate sequence with regard to the pulses at G to I, in order to effect alternate operation of the samplers in first and second branches of the transmitter in Fig. 4, for continuous production of the carrier envelopes.

In Fig. 4, the pulse producers are shown by the blocks 22 and 23. These pulse producers may be arranged in various forms, but the arrangement shown in my U. S. Patent No. 2,558,489 issued June 26, 1951, Fig. 13 and by the illustrated pulses at 14e in Fig. 14 will be found suitable for the purpose.

Figure 1:
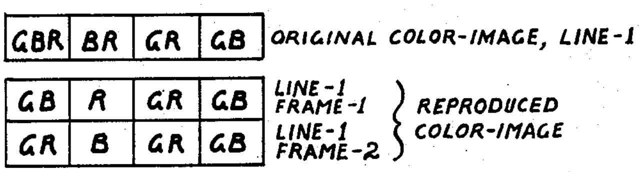
Figure 1A:
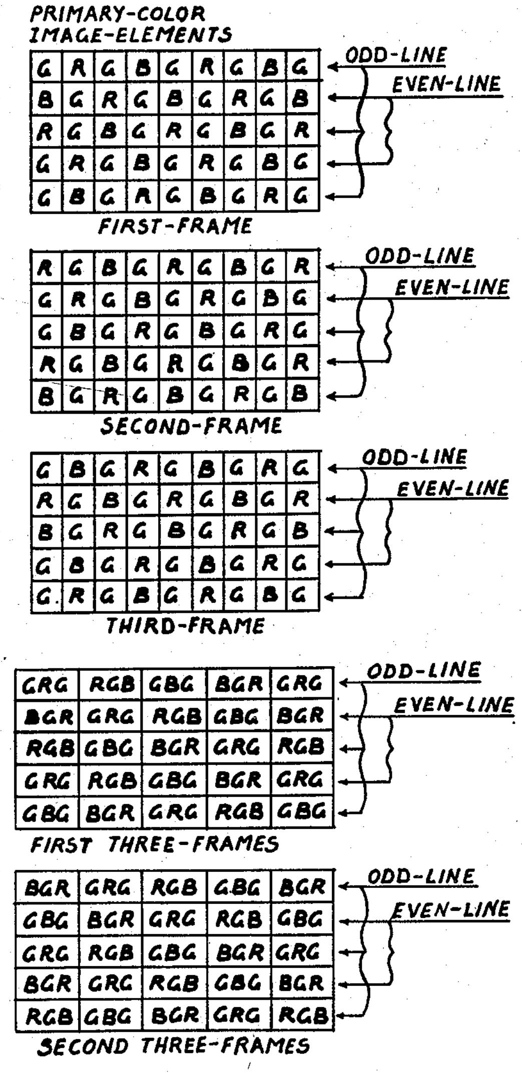

With reference to the color sequence shown in Fig. 1a, it was described in the foregoing that, a saturation control must be included for the GREEN primary color, in alternate time-division periods. This is achieved by doubling the frequency $f_m/2$ to $f_m$ in block 24; half-wave rectifying in block 25; and applying the periodic output voltages upon the GREEN video source to control the gain of these signals.

With reference to color-sequence reversal, it will be noted in the arrangement of either Fig. 3 or Fig. 4 that, during phase-shifting periods of oscillations I and II, the combined output voltage of amplitude-limiters 8 and 9 must remain constant; either on or off, so as to avoid cross-switching between the RED and BLUE video signals. The steady condition of limiters 8 and 9 is easily achieved by time dividing the original video signals in phase with the sampling periods, and wave-shape these time-divided signals in the video amplifiers, such as by the arrangements in ordinary video amplifiers, to ensure that during carrier-phase-shifting and/or sampling periods the statistic video signals do not change from one light level to another. This is shown in Fig. 4, wherein, the output of block 24 is full-wave rectified into unidirectional pulses, and applied upon the three video-signal sources for time division of the signals.

*Phase modulated sync pulses*

Figure 6:
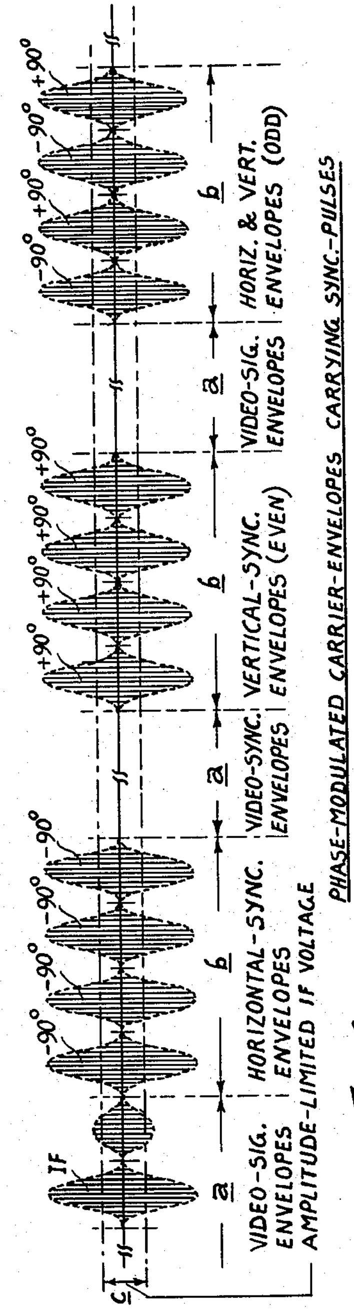
Fig. 6 illustrates waveforms of the modulated carrier wave, in which phase modulation is utilized to convey picture-synchronizing signals.

In the drawing of Fig. 6, there is shown a waveform of the time-divided carrier envelopes, wherein, the time areas *a* are devoted to the conveyance of video signals, and the time areas *b* are devoted to the conveyance of synchronizing pulses. In the first section of areas *b*, the carrier phase is shifted 90 degrees backward in every succeeding envelope; representing the horizontal synchronizing pulse. In the second section of areas *b*, the carrier phase is shifted 90 degrees forward in every succeeding envelope; representing the vertical synchronizing pulse; for even-line. And the third section of areas *b*, the carrier phase is shifted backward and forward sequentially from envelope to envelope; representing simultaneous horizontal and vertical pulses; for odd-line. The number of carrier envelopes during each synchronizing pulse is of no importance, but it is dependent upon the duration of the phase-modulating pulse at the transmitting end.

*Phase discriminator for video-signals and for horiz-vert sync pulses*

Figure 7:
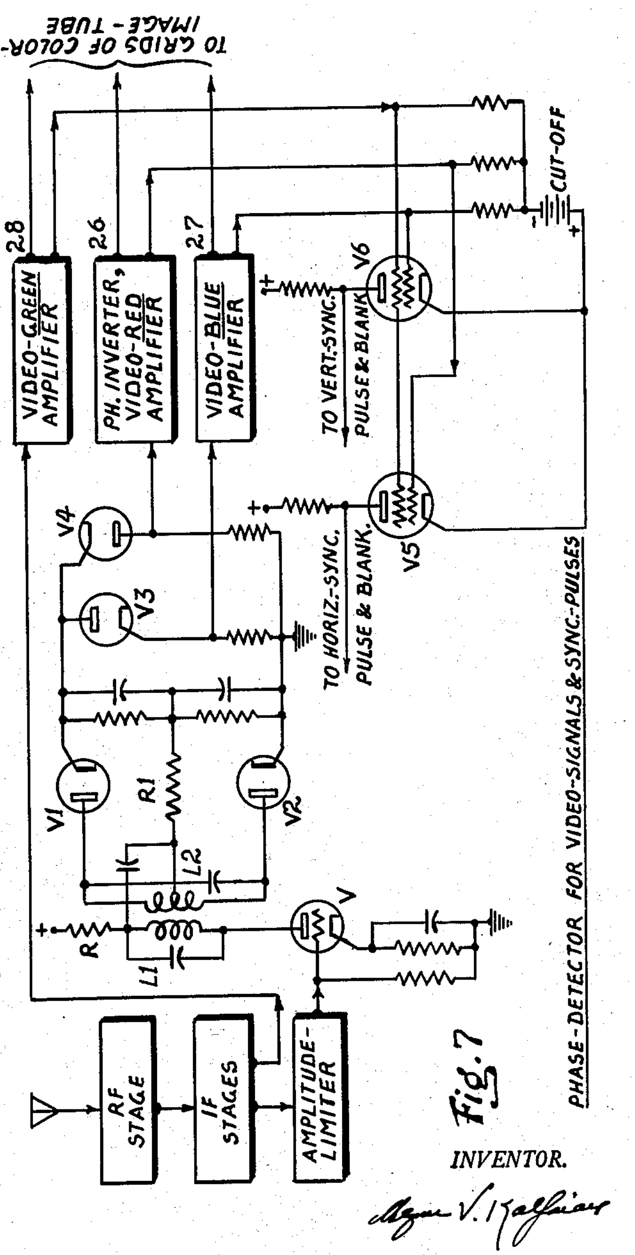
Fig. 7 is an arrangement for detecting phase-modulated signals.

In the first step of detecting the phase modulated carrier wave, the amplitude variations of the carrier envelopes are limited as indicated by the dot-and-dashed lines *c*, in Fig. 6. When the carrier envelopes are thus limited in amplitude, the output will be (disregarding the narrow dips between the envelopes) as if the carrier were of constant amplitude, and that the phase angle were shifted abruptly in time-division steps. This type of phase modulation is detected by the phase discriminator circuit given in Fig. 7. The general circuitry is similar to the well known Seely type of frequency discriminator, except that, the anode circuit of amplifier tube V comprises a resistance R, in series with the resonant circuit L1 having a resolution time constant equal to one time-division period. Thus, at the beginning of each time-division, the carrier phase in R and L1 will differ by an angle that is a function of the incoming video signal; this phase difference gradually resolving into in-phase relation at the end of each time-division. Due to the normal quadrature phase relation between L1 and L2, and therefore normal quadrature phase relation between the voltages across R1 and L2, and also due to the symmetric connections of diodes V1 and V2, the voltage from cathode terminal to ground will normally be zero. When the incoming carrier shifts its phase in forward direction, the cathode terminal of diode V1 will be more negative than at the cathode terminal of V2. Whereas, when the phase shifts in backward direction, the cathode side of V1 will be more positive. These positive and negative output voltages are further rectified by diodes V3 and V4, so as to obtain independent output signals representing video signals of different primary colors, which are amplified by the video amplifiers in blocks 26 and 27. The amplitude modulated video signals (GREEN primary-color in this case) are amplitude detected (not shown in the diagram), and amplified by the video amplifier in block 28; the outputs of the three video amplifiers are then applied upon the control grids of a color-image reproducing device.

For the separation of picture synchronizing pulses, the outputs of video amplifiers 26 and 27 are separately applied upon one of the control grids of multicontrol electron tubes V5 and V6, which are normally biased to anode current cut-off. The output of video amplifier 28 is applied upon the other control grids of these tubes in parallel. Due to the extreme negative bias applied upon the control grids of these gate tubes, anode current flows only when positive voltages are applied to both control grids simultaneously. Thus, when the amplitude of the video carrier is raised above a predetermined level at the transmitting end, assigned as synchronizing-level, the output voltage of video amplifier 28 raises the potentials upon the second control grids of gate tubes V5 and V6 to the operating point, so that the phase-modulated synchronizing pulses from the outputs of video amplifiers 26 and 27 operate one or both of the gate tubes for picture synchronization. The amplitude rise of the carrier wave to synchronizing level is achieved by the arrangement shown in Fig. 3, wherein, the block designated as, sync pulse, applies negative pulse to the source of GREEN video signals to render it inoperative, and applies positive pulse to the AM samplers 15 and 16 to raise the carrier amplitude level. This arrangement is not shown in Fig. 4, for simplicity of drawing.

*Phase modulator of sync pulses*

Figure 8:
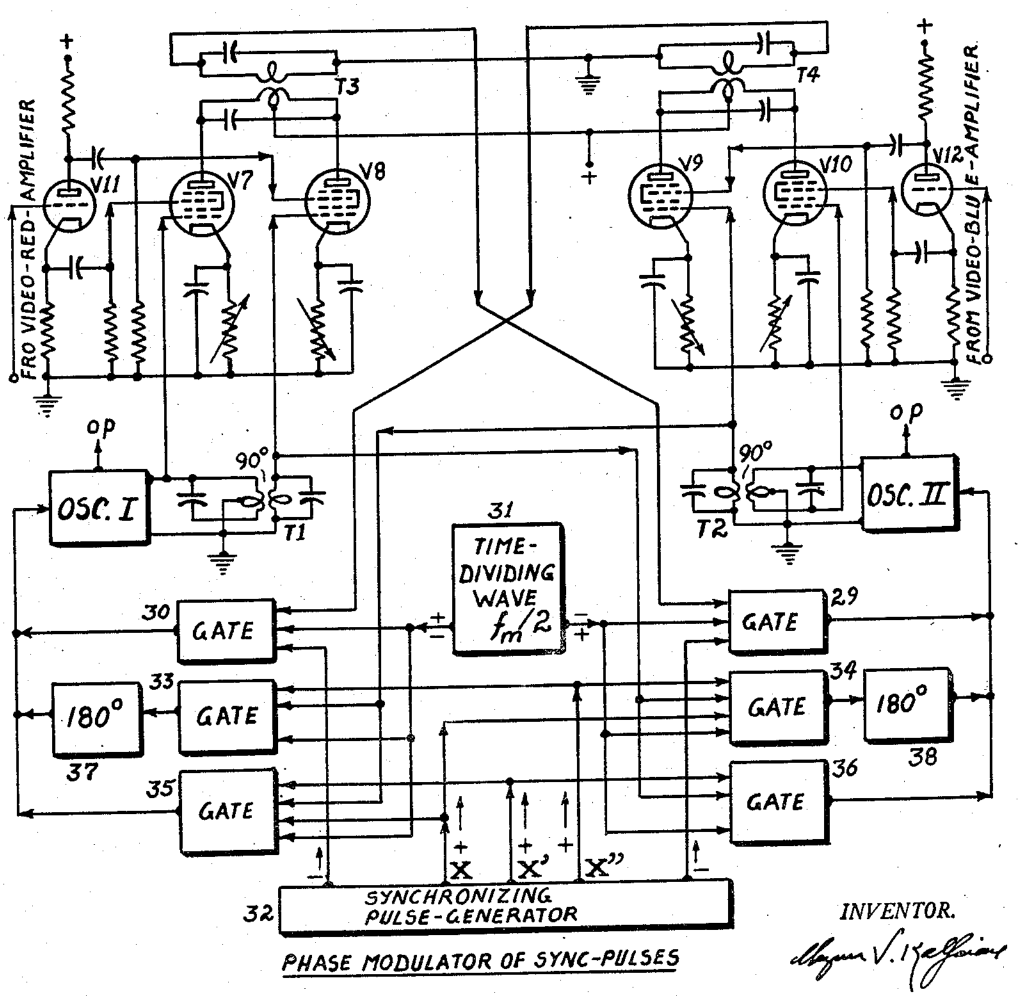
Fig. 8 is a block diagram of the phase modulator for synchronizing signals.

Fig. 8 is a modification of the block diagrams in Fig. 3 or 4, but in this case, only phase modulation is shown. The outputs of oscillators I and II are split in phase 90 degrees by the transformers T1 and T2, and applied independently upon the control grids of phase modulator tubes V7, V8 and V9, V10. The cathode bias of modulator tube V8 is so adjusted that the tube normally operates at its maximum transconductance. Whereas, the cathode bias of tube V7 is so adjusted that the tube normally operates at its minimum transconductance; these adjustments being such that, the $G_m$ curve between maximum and minimum is substantially linear. Thus, the anode circuit of tube V8 normally contains maximum oscillatory current, and the anode of tube V7 normally contains minimum oscillatory current. The anode circuit, comprising transformer T3, further shifts the phase angle of the output wave by 90 degrees, and applies upon the oscillator II, in the same phase angle as it originated in the oscillator I. When the positive video RED signal arrives at the control grid of cathode follower and phase inverter tube V11, the video signal is applied upon the second control grid of V7 in positive polarity, and upon the second control grid of V8 in negative polarity. In this manner, the transconductance of tube V7 is increased, and the transconductance of tube V8 is decreased, with the result that the phase angle of oscillation I in transformer T3 is shifted forward in its application upon the oscillator II. The operation of phase modulator tubes V9 and V10 is similar to the operation of V7 and V8, but in this case, the BLUE phase-modulated oscillation II retards the phase angle of oscillation I, by reason of the inverted connection of transformer T2.

The output oscillation of I after being phase modulated by the RED video signal, it is applied upon the oscillator II, through gate 29, while the output oscillation II after being phase modulated by the BLUE video signal, it is applied upon the oscillator I, through gate 30. The gates 29 and 30 are operated in alternate time periods by the alternate positive half-cycle voltages of the time-dividing wave produced in block 31. For the video-signal modulation, the output of oscillator I (at op) contains periodic steady state phase modulations representative of the video BLUE signals, and the output of oscillator II (at op) contains periodic steady state phase modulations representative of the video RED signals; in sequence with respect to each other. In the case when image-multiplexing is employed, such as described by way of the illustration in Fig. 5, and the block arrangement of Fig. 4, then the oscillations I and II are time divided by the blocks 22 and 23.

Figure 9:
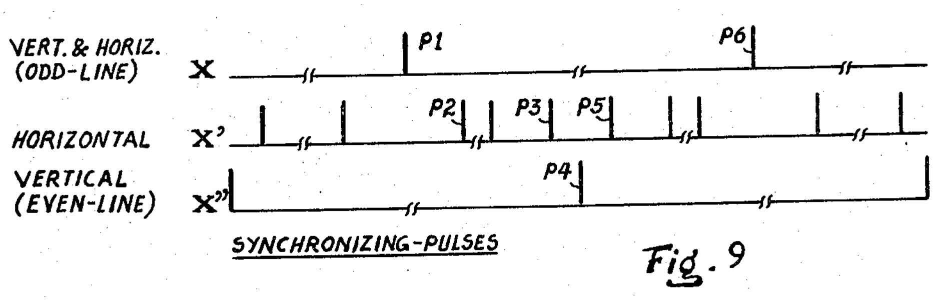
Fig. 9 illustrates the sequence of pulses representing the vertical and horizontal synchronizing signals for operating the arrangement of Fig. 8.

The synchronizing pulses are generated in positive polarity at the output terminals X, X′ and X″ of block 32; in the form as shown in Fig. 9. Simultaneously with these pulses, there are produced pulses in negative polarity, as indicated at the extreme end terminals of block 32, which are applied upon the gates 29 and 30 to render them inoperative, and prevent the signal modulation from interfering with the pulse modulation. The gates 33, 34 and 35, 36 are normally rendered inoperative, and are so arranged that, they operate only when simultaneous positive voltages are applied upon, by the alternate positive half-cycle voltage of the time-dividing wave in block 31 and the positive pulse from the pulse generator 32. The output oscillation I after being 90° phase-retarded by the transformer T1 is applied upon the inputs of gates 34 and 36 simultaneously, while the output oscillation II after being 90° phase-retarded by the transformer T2 is applied upon the inputs of gates 33 and 35 simultaneously. The output voltages of gates 33 and 34 are phase inverted by the blocks 37 and 38, so that when the gates 33 and 34 are operated alternately by the simultaneous synchronizing positive-pulse from block 32 and alternate half-cycle positive-voltages from block 31, the oscillations I and II will be advanced in phase by 90 degrees in every succeeding half-cycle periods of $f_m/2$. The outputs of gates 35 and 36 are applied in phase upon the oscillators I and II, so that when the latter gates are operated, this time the oscillations I and II will be retarded in phase by 90 degrees in every succeeding alternate intervals of the wave $f_m/2$. When however, the pulse generator applies a positive pulse upon gates 34 and 35 simultaneously, the oscillation II passing through gate 35 retards the phase angle of oscillation I, and the oscillation I passing through gate 34 advances the phase angle of oscillation II, causing sequential phase-retarding and phase-advancing of the carrier wave from envelope to envelope. In this case, and with reference to the phase discriminator in Fig. 7, both the vertical and horizontal scannings are acted upon simultaneously, for odd-line field scanning.

*Sequence of sync pulses*

The distribution sequence of horizontal and vertical pulses is shown in Fig. 9. At P1, both the vertical and horizontal pulses at X are present simultaneously (by way of cross-connection in the block diagram of Fig. 8), for odd-lines. From this point on, the horizontal pulses P2 at X′ continue. Between the last two pulses, P3 and P5 of the odd-line field, the vertical pulse P4 is produced at X″, for even-lines. From this point on the horizontal pulses continue, until at the last horizontal pulse P6, where both the horizontal and vertical pulses appear at X, for a new start of the odd lines.

*Interference meter*

Figure 10:
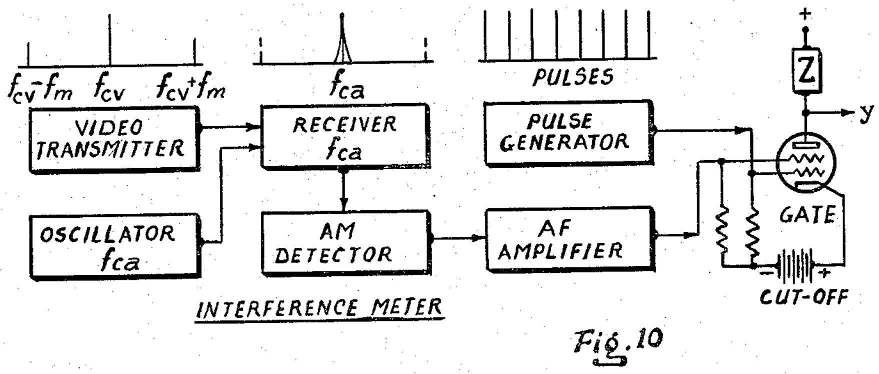
Fig. 10 is an interference meter in accordance with the invention.

One type of interference meter is shown in Fig. 10. The output of video transmitter is applied upon the narrow-band receiver simultaneously with the output of oscillator $f_{ca}$, which simulates as an interposed audio-channel. In the absence of the video-transmitter output, the oscillator output represents zero signal. Whereas in the presence of video-transmitter output, the oscillation at frequency $f_{ca}$ will be modulated. When this modulation is in the audio-frequency range, it will be detected and amplified by the AF amplifier. In the drawing, there is shown a pulse generator, which produces short pulses at some predetermined intervals. These pulses are applied upon the first control grid of the gate tube, in positive polarity. Simultaneously, the output of AF amplifier is applied upon the second control grid of the gate tube; also in positive polarity. The control grids of this gate tube are so biased that, it operates by the pulses only when a simultaneous output voltage arrives from the AF amplifier. Thus, with the presence of AF signals, the pulses will appear at the output impedance Z, which are applied upon one of the phase modulators of the transmitter in Fig. 3 or 4, as designated by the letter *y*. Such phase shift of the video carrier will tend to oppose the oscillation $f_{ca}$, and reduce the output of the AF amplifier, indicating that the interposed audio-channel is free of video interference. The osciliator $f_{ca}$ is shown in the drawing for illustration, but it is not necessary in actual practice; although it may also be obtained and used from the actual audio-carrier.

*Receiver*

Figure 11:
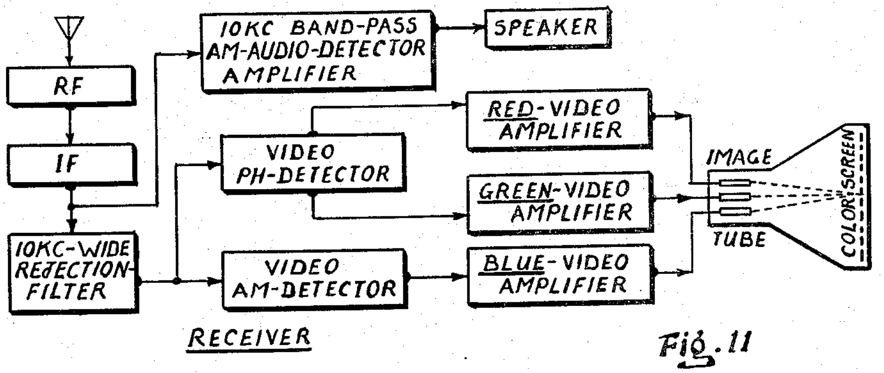
Fig. 11 is a block diagram of the receiver of color signals in accordance with the invention.

Fig. 11 is a block diagram of one form of the receiver, which may be employed in accordance with the invention. The incoming wave is passed through an RF stage; IF stages; a 10kc.-wide rejection filter to cancel out the audio modulation; and finally demodulated by the amplitude and phase video-detectors. The output of AM detector is applied upon the input of video BLUE amplifier, and the output of PH detector is supplied upon the video GREEN and RED amplifiers; their inputs being polarized so as each to respond either to positive or negative signals of the detector. In this case, it is assumed that the BLUE video signals are carried over amplitude modulation. Outputs of the three video amplifiers are then independently applied upon the control grids of a tri-color image tube for final color-picture reproduction. For sound reproduction, output of the I. F. stages is passed through a band-pass circuit of 10kc. width, the output of which is amplitude detected, as shown in the drawing. If however, the sound waves are transmitted over a carrier wave, having a frequency outside the video spectrum band, then the rejection filter is eliminated, and the sound wave is detected in the conventional manner; in either case of amplitude or frequency modulation.

*Modified arrangement of receiver*

Referring back to the type of video modulation, as shown in Fig. 2, and disregarding the phase modulation for the moment, it is seen that the video signals are carried over the peaks of the envelopes. Whereas in the conventional mode, the signals are carried over both the rise and fall (positive and negative alternations) of the envelopes. That is, the time of signal resolution allowed in the present type of modulation is twice the time that is normally required in the conventional type; causing a waste of useful bandwidth. This condition indicates that the band-pass of the receiver may be 3 megacycles, instead of 6 megacycles wide, since the I. F. current need only to follow the peaks of the envelopes. However, when phase modulation is included, the delayed action of phase resolution from envelope to envelope will not be the ideal in this system. To obviate this delay, the last I. F. stage is divided into two branches, the oscillatory signals in which are periodically built-up and dissipated; the method of which is sometimes used in diversity receivers.

Figure 12:
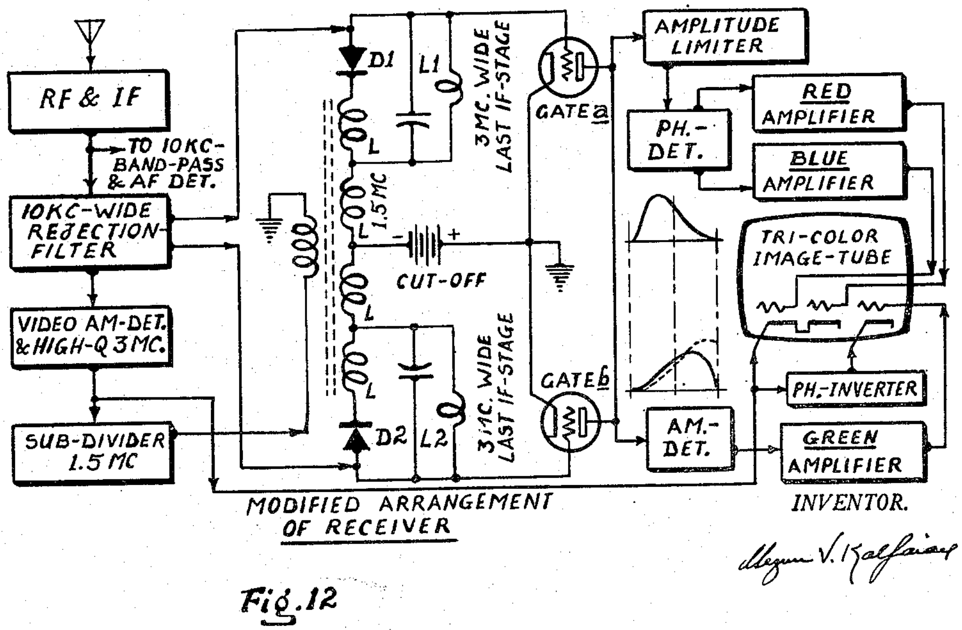
Fig. 12 is a modified arrangement of same.

Fig. 12 is a modified arrangement of the receiver, wherein, the incoming wave is passed through wide-band R. F. and I. F. stages, the output of which is applied upon two separate high Q tuned circuits, L1 and L2. The high frequency voltages across coils L1 and L2 are passed through the gate tubes *a* and *b*, during alternate half-cycle voltages across L, at a frequency of 1.5 megacycles. The poles across coils L, as well as the diodes D1 and D2 are so arranged that, when gate *a* is switched on, the diode D1 is idle, and coil L1 starts building proportional amplitude of oscillatory voltage, while gate *b* is switched off, and diode D2 damps out the oscillatory voltage across coil L2, and vice versa. The periodic outputs of coils L1 and L2 are then combined at the outputs of gates *a* and *b*, for amplitude and phase detection.

Figure 5:
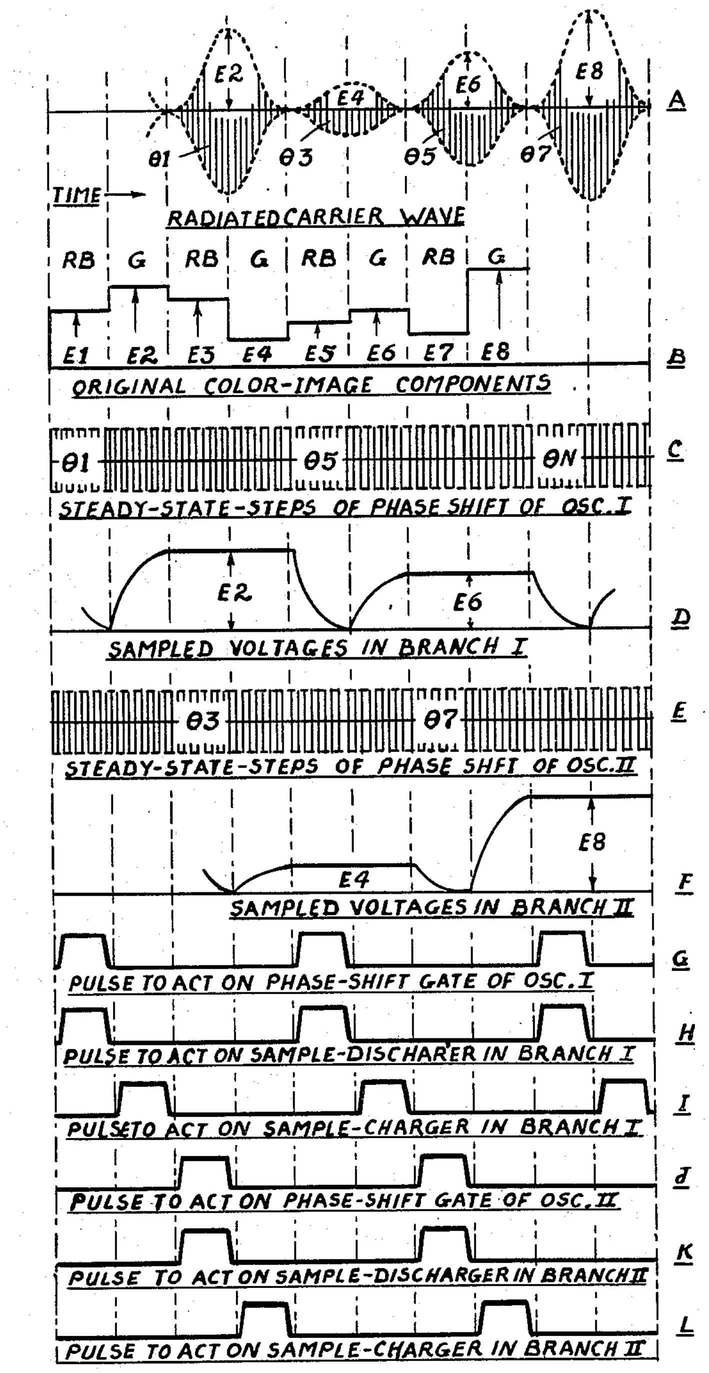
Fig. 5 illustrates various waveforms describing the operation of Fig. 4.

The modified arrangement in Fig. 12 is particularly suitable when multiplexing of image elements is employed at the transmitting end, such as described by way of the graphical illustration in Fig. 5. Due to the slow rising oscillatory current in coils L1 and L2, the peak of the output envelope will shift to the right, as shown by the dotted curve immediately above block diagrams of the AM-detector. Then, by the gated action, the curve is changed to the form as shown by the solid line. When the combined outputs of coils L1 and L2 are phase detected, after passing through the amplitude limiter, as shown, the peak of the envelope will shift to the left, as shown by the curve immediately below block diagram of the PH-detector. This condition was explained by way of the phase detector of Fig. 7. The oppositely peak-displaced output voltages of the amplitude and phase detectors are then switched on and off, either at the video amplifiers, or the three individual control grids of a tri-color image reproducing tube, by the alternating wave at 3 megacycles, which is obtained from the block of high Q tuned circuit at 3 megacycles. In the drawing, outputs of the phase detector are amplified by the RED and BLUE video amplifiers, and output of the amplitude-detector is amplified by the GREEN video amplifier. Outputs of these video amplifiers are independently applied upon the control grids of a tri-color image reproducing tube, to effect the final color-picture. For switching purpose, the three control grids of this image tube are normally so biased that, they operate by the video signals only when switching positive voltages are applied upon the grids. To effect this operation, alternate half cycle potentials of the wave at 3 megacycles is shown applied directly upon the first two cathodes in parallel, and applied upon the third cathode through the phase inverter for alternate switching. Since the switching wave a 3 mc. is derived from the incoming time-divided carrier envelopes, both frequency and phase of the switching wave is permanently fixed. With reference to shifting of the amplitude and phase modulated video signals in time position, it will be noted that such shift in time position may also be achieved by a delay-line.

While I have described what is at present considered the preferred embodiment of the invention, it will be obvious to the skilled in the art that, various substitutions of parts, adaptations and modifications are possible without departing from the spirit and scope thereof.

What is claimed is:

1. In color television where each scanned image element is conveyed in separate primary-color components, the system of producing and transmitting video signals in values representing primary-color components of the image elements, which comprises: means for scanning color-pictures in the usual sense of horizontal and vertical directions in a frame period; including horizontal and vertical retracings, and means to derive therefrom simultaneous video signals representing first; second; and third primary-color components of the image elements, means for time dividing the video signals at a frequency rate equal to the highest number of image elements to be conveyed per second, means for producing a carrier wave and means therefor for time dividing it into individual envelopes at a frequency rate equal half that of the time-divided image elements, means for modulating the carrier amplitude step by step in every succeeding envelope by the first primary-color components of every second of the time-divided image elements, means for advancing the phase angle of the carrier wave step by step in every second envelope by the second primary-color components of every fourth of the time-divided image elements; lying in time positions ahead of last said every second image elements, means for retarding the phase angle of the carrier wave step by step in every other second envelope by the third primary-color components of every fourth of the time-divided image elements; lying in time positions behind of last said every second image elements, whereby first, to provide modulation of each carrier envelope by simultaneous sets of two succeeding image elements in different primary colors, and second, to provide scansion of elemental images in singular primary-colors substantially elementally-different from adjacent image elements in a picture frame so as to effect mutual-aid in visually forming chromatic-picture in a single scanned-frame by substantially all the image elements that would normally be available for monochrome-picture in a single frame, means for altering the scansion sequence of primary-color components of said elemental images during relatively slow frequency rate of successive frame periods, whereby said image elements are further resolved individually into their full three-color hues during successive frame periods, and means for transmitting the modulated carrier envelopes.

2. The system as set forth in claim 1, which includes means for controlling the amplitude level of said color components during elemental scansions, whereby to correct distortion in hue that may occur at various elemental areas due to differences in average time-lengths of scansion devoted to each primary-color of the image elements.

3. The system as set forth in claim 1, wherein, said phase-advancing and phase-retarding means consist in combination means for shifting the carrier phase in said succeeding envelopes step by step representative of said color components by difference-angles measurable from phase angles of the carrier in immediate preceding envelopes, so that the angle in each step of phase change represents a reference angle to a succeeding step of phase change.

4. The system as set forth in claim 1, which includes means for receiving said transmitted carrier envelopes, means for deriving separate video signals from said amplitude; phase-advancing; and phase-retarding modulated carrier envelopes, a color-image reproducing device, and means for controlling the operation of said device by said derived signals for the final reproduction of the original color-picture.

5. The system as set forth in claim 1, which includes means for receiving said transmitted carrier envelopes, means for deriving separate video signals from said amplitude; phase-advancing; and phase-retarding modulated carrier envelopes, means for shifting the time-positions of video signals derived from said amplitude and phase modulations in harmony with the original time-positions of said time-divided image elements, and means for operating appropriate color-picture reproducing apparatus by said time-shifted video signals for the final reproduction of the original color-picture.

6. The system as set forth in claim 1, which includes means for producing and transmitting a sound-carrying wave having a fundamental frequency lying in the spectrum band of the video signals, means for producing sound waves, means for modulating the amplitude of said sound-carrying wave by said sound waves, means for measuring the amount of video-signal contribution that is imposed upon the sound-wave, and according to such measurement, means for shifting the phase angle of the carrier in said video-envelopes periodically, whereby to cancel out the video-signal contribution periodically during any one of the sound-wave cycles, means for receiving both of said video and sound carrier-waves, means for cancelling out the sound carrier-wave and its modulations thereof from the video carrier-wave, means for separating sound-waves and video-signals from said amplitude; phase-advancing; and phase-retarding modulations, means for shifting the time-positions of video signals derived from said amplitude and phase modulations in harmony with the original time-positions of said time-divided image elements, and means for operating a color-picture reproducing device by last said time-shifted video signals.

7. The system as set forth in claim 1, which includes means for producing and transmitting sound-carrying wave having a fundamental frequency lying in the spectrum band of the video signals, means for producing sound waves, means for modulating the amplitude of said sound-carrying wave by said sound waves, means for measuring the amount of video-signal contribution that is imposed upon the sound-wave, and according to such measurement, means for shifting the phase angle of the carrier in said video-envelopes periodically, whereby to cancel out the video-signal contribution periodically during any of the sound-wave cycle, said measuring means comprising: a circuit tuned to the fundamental carrier-frequency and having narrow band-pass to admit sound-wave modulations only, means for shifting the video-modulated carrier wave upon the input of last said tuned circuit, means to demodulate the output carrier of any low-frequency modulations that pass through the circuit, a pulse generator producing short pulses at predetermined intervals, a normally non-operative gate, means for applying last said pulse and said demodulated signals upon said gate simultaneously; said gate being so adjusted that it operates only when simultaneous pulse and demodulated signals are present, whereby said gate operates during an applied pulse when said demodulated signal is present, and means for applying the output signal of said gate upon one of said phase modulators of the video-carrier wave, so as to shift the carrier phase by way of carrier-wave opposition until said demodulated signal disappears.

8. The system as set forth in claim 1, which includes means for transmitting picture-synchronizing pulses during said horizontal and vertical retracings by the following means: means for cancelling out said video modulations during said retracing periods, means for shifting the amplitude of said carrier envelopes to an amplitude-selective level assigned to convey synchronizing pulses, means to shift the carrier phase in first direction from envelope to envelope in continuous steps; said phase shifts representing the horizontal synchronizing pulse, means for shifting the carrier phase in second direction from envelope to envelope continuous steps; said phase shifts representing the vertical synchronizing pulse, means for shifting the carrier in said first and second directions sequentially from envelope to envelope; said phase shifts in sequential first and second directions representing simultaneous horizontal and vertical synchronizing pulses, means for receiving the composite modulated carrier wave, means for selecting the amplitude; phase-advancing; and phase-retarding carrier signal-modulations from the carrier amplitude-level assigned to signal modulations; to operate appropriate color-picture reproducing apparatus, and means for selecting the synchronizing pulses from the carrier amplitude-level assigned to pulse modulations; to operate appropriate picture-synchronizing apparatus for final reproduction of the color-picture.

9. In color television system, apparatus which comprises in combination the following parts: means for scanning color-pictures in the usual sense of horizontal and vertical directions in a frame period, and means therefor for deriving therefrom simultaneous video signals representing first; second; and third primary-color components of the image elements, a switching wave, and means therefor for time-dividing the video signals at a frequency rate equal to the highest number of image elements to be conveyed per second, means for producing a carrier oscillation in first and second channels, cross-coupled first and second gates relative to the first and second channels, alternating switching wave having one fourth of the time-divided frequency, and means therefor for operating the first and second gates alternately, whereby the oscillations in first and second channels shift each other's phase angles periodically at a frequency rate equal half that of the time-divided frequency, third and fourth gates having a combined common output at the outputs of said first and second channels, means for operating last said gates alternately by said alternating switching wave, so as to combine the output oscillations of the two channels at the common output of last said gates sequentially in those periods during which the oscillations are in steady states, means for amplitude modulating the steady state portions of the carrier oscillations in the first and second channels in steady state steps by the first primary-color components of every second of the time-divided image elements, fifth and sixth gates and first phase modulator associated with the first channel; seventh and eighth gates and second phase modulator associated with the second channel, means for rendering the fifth and seventh gates just short of operation; and the sixth and eighth gates operative, alternately by said alternating switching wave, means for advancing the phase angle of output oscillation of the first channel in the first phase modulator through the fifth gate by the second primary-color components of every fourth of the time-divided image elements lying in time-positions ahead of said every second image elements, means for retarding the phase angle of output oscillation of the second channel in the first phase modulator through the sixth gate by the third primary-color components of every fourth of the time-divided image elements lying in time-positions behind of last said every second image elements, means for retarding the phase angle of output oscillation of the second channel in the second phase modulator through the seventh gate by the third primary-color components of every fourth of the time-divided image elements lying in time-positions behind of last said every second image elements, means for advancing the output oscillation of the second channel in the second phase modulator through the eighth gate by the second primary-color components of every fourth of the time divided image elements lying in time positions ahead of last said every second image elements, first and second amplitude-limiters, means for applying the second primary-color components of every fourth of the time-divided image elements lying in time-positions ahead and behind of said every second image elements upon the first limiter; means for applying the third primary-color components of last said every fourth of the image elements upon the second limiter, whereby the output of the first and second limiters are substantially either on or off depending on whether the input signals are present or not, means for applying the output of the first limiter upon the fifth gate to render it operative by the simultaneous application of said alternating switching wave; means for simultaneously applying the output of the first limiter upon the sixth gate in opposite polarity so as to render it inoperative, whereby the output oscillation of the first channel is phase modulated by the normally assigned video signal when it is present at a given time-division interval; and phase modulated by the other video signal when the former is not present at that time, means for applying the output of the second limiter upon the seventh gate to render it operative by the simultaneous application of said alternating switching wave; means for simultaneously applying the output of the second limiter upon the eighth gate in opposite polarity so as to render it inoperative, whereby the output oscillation of the second channel is phase modulated by the normally assigned video signal when it is present at a given time-division interval and phase modulated by the other signal when the former is not present at that time, means for cross-applying the outputs of said first and second phase modulators upon the inputs of said first and second channel through the alternately operated first and second gates, whereby to effect at the combined common output of the third and fourth gates carrier oscillation whose amplitude is shifted in steady state steps representative of the video signals at the carrier time-division frequency rate; and whose angle is shifted in steady state steps by representative angles measurable from phase angles of the carrier in preceding time-division steps, means for time dividing the combined carrier wave into individual envelopes in phase with the outputs of last mentioned gates, waveshaping the rise and fall of last said envelopes to that of the simple curve of the sine-squared function, thereby to avoid widely expanded multiple pairs of complementary sidebands that are usually associated with steep sided rise and fall of the carrier envelopes, and means for transmitting same.

10. Apparatus as set forth in claim 9, which includes means for controlling the amplitude level of said color components so as to correct distortion in hue that may occur at various elemental areas due to differences in average time-lengths of scansion between various primary-color components, which comprises means for combining the outputs of said first and second amplitude limiters, a ninth gate operative only by the combined additive outputs of said limiters, means for applying the combined outputs of said limiters upon the ninth gate, and means to apply the output of this gate upon said means of producing video signals of said second and third primary-color components to control their amplitude-gains.

11. Apparatus as set forth in claim 9, which includes in combination a receiving apparatus adapted to translate said transmitted carrier wave into the original said color-pictures which comprises: means for receiving the transmitted wave, means for converting the received wave into intermediate frequency wave, means for deriving said alternating switching wave from said intermediate wave, first and second relatively low-decrement circuits tuned to last said wave, means for applying last said wave upon the first and second tuned circuits, first diode or diodes and first impedance or impedances connected in series across said first circuit; second diode or diodes and second impedance or impedances connected in series across said second circuit, whereby said diodes may damp out oscillatory energy when present in said circuits at a relatively rapid rate, first and second gates, means for applying said derived alternating switching wave alternately upon said first and second diodes and the first and second gates to operate same, in such time-divided intervals as when the first gate is operative the first diode is inoperative while the second diode is operative, and vice versa, whereby the intermediate frequency wave is built up in the first and second circuits alternately; rising in amplitude slowly during each time-divided envelope period, and thereby shifting the peak amplitude closer to the end of the envelope, means for combining the alternate outputs of said gates at a common output, means for detecting the video signals of said first primary-color components from the amplitude variations of last said output, means for substantially limiting the amplitude variations of last said output, whereby to obtain the intermediate frequency output wave substantially in constant amplitude, a third circuit tuned to last said wave having phase resolution time-constant approximately equal to one time-divided period; and a fourth circuit having high resolution time constant, means for applying said amplitude-limited wave upon the third and fourth circuits, thereby causing greater amount of oscillatory phase difference in the third and fourth circuits at the beginning than at the end of each time-divided carrier envelope, means for deriving video signals of said second and third primary-color components from last said phase differences, whereby the amplitude peaks of the derived signals are shifted toward the beginning of each envelope, a tri-color image reproducing device having first; second; and third control elements, and means for applying lastsaid derived first; second; and third video signals upon their respective last said control elements for final reproduction of the original color-picture.

12. The system as set forth in claim 1, which includes in combination, means for reversing the normal sequence of said phase-modulating second and third primary-color components randomly at elemental carrier-envelope periods depending on which of the two color components is present or predominates the other, whereby greater portion of the total effective time devoted to conveyance of video signals is utilized to further the color and image resolution.

MEGUER V. KALFAIAN.

References Cited in the file of this patent

UNITED STATES PATENTS

| Number | Name | Date |
|---|---|---|
| 1,956,397 | Nicolson | Apr. 24, 1934 |
| 2,048,081 | Riggs | July 21, 1936 |
| 2,428,118 | Labin | Sept. 30, 1947 |
| 2,495,739 | Labin | Jan. 31, 1950 |
| 2,539,440 | Labin | Jan. 30, 1951 |
| 2,541,076 | Labin | Feb. 13, 1951 |
| 2,558,489 | Kalfaian | June 26, 1951 |